July 23, 1929.   A. F. FROUSSARD   1,721,902
CLUTCH MECHANISM FOR PRESSES
Original Filed March 14, 1924   2 Sheets-Sheet 2
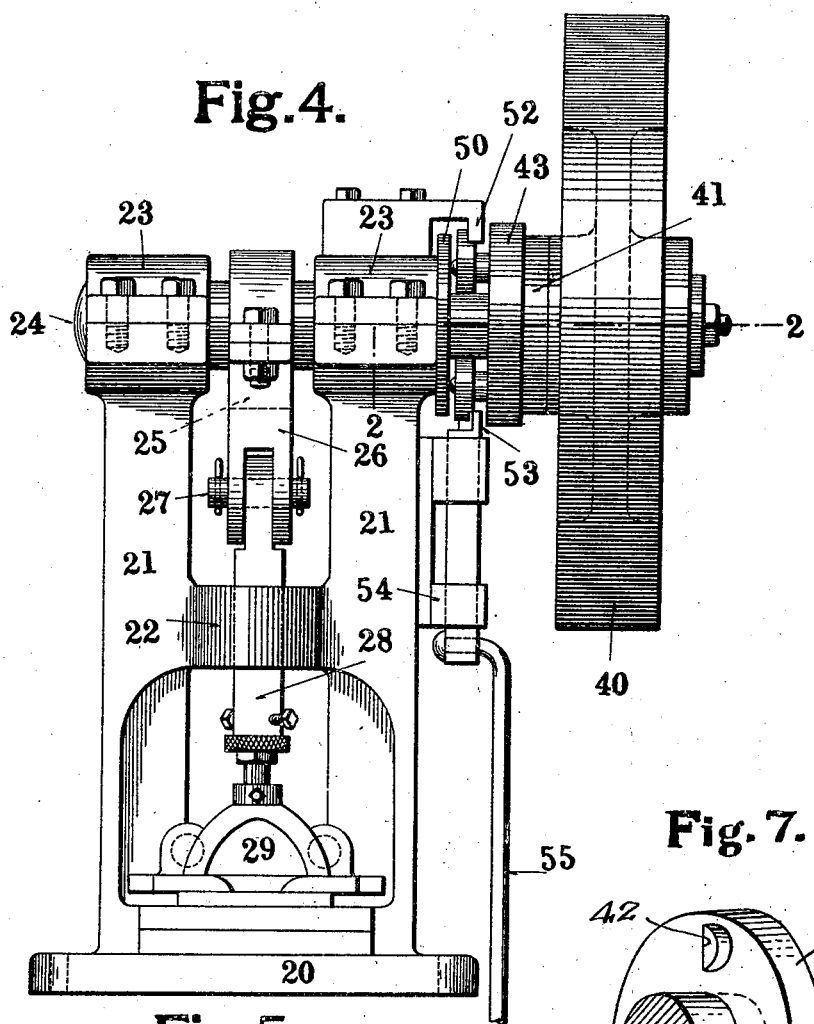
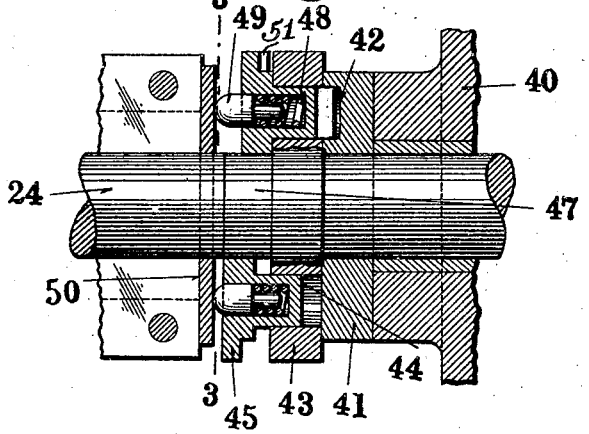
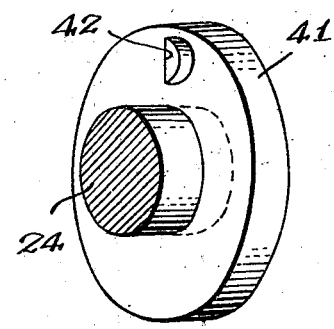
INVENTOR
A. F. FROUSSARD
BY *E. E. Huffman*
ATTORNEY Patented July 23, 1929.

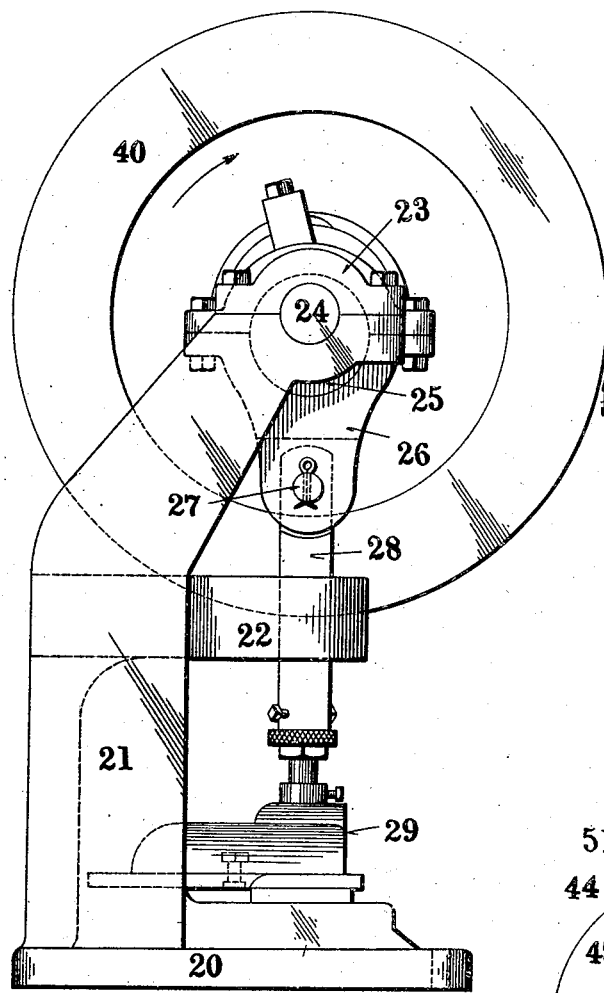
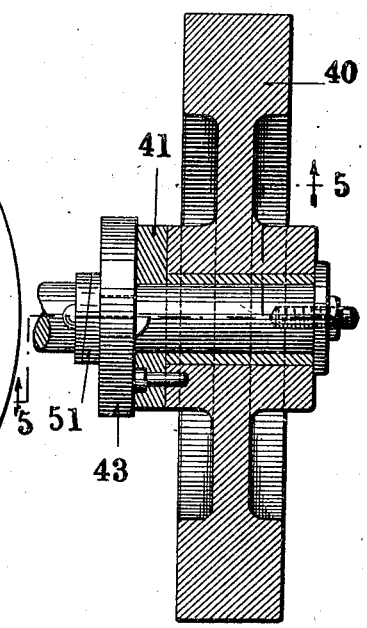
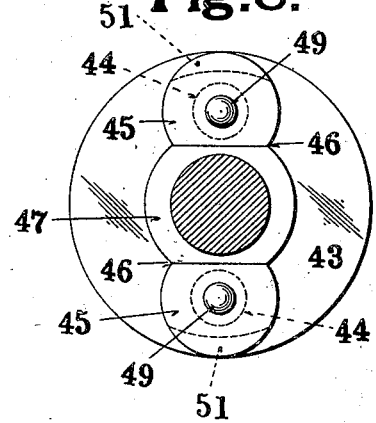
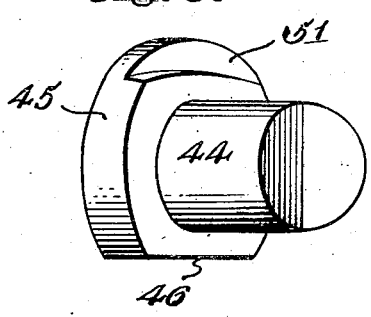
INVENTOR
A. F. FROUSSARD

1,721,902

UNITED STATES PATENT OFFICE.

ALBERT F. FROUSSARD, OF ST. LOUIS, MISSOURI.

CLUTCH MECHANISM FOR PRESSES.

Original application filed March 14, 1924, Serial No. 699,195. Divided and this application filed September 21, 1925. Serial No. 57,499.

My invention relates to a clutch mechanism for presses and is a division of application Serial No. 699,195 filed by me March 14, 1924.

In the accompanying drawings, which illustrate one form of press embodying my invention, Figure 1 is a side elevation; Figure 2 is a section taken on the line 2—2 of Figure 4; Figure 3 is a section taken on the line 3—3 of Figure 5; Figure 4 is a front view; Figure 5 is an enlarged section taken on the line 5—5 of Figure 2; Figure 6 is a perspective view of one of the detents; and Figure 7 is a perspective view of the driving disk.

The frame of the machine comprises a base 20 and a pair of uprights 21 connected at a point intermediate of their height by a plunger bearing 22. The upper ends of the uprights 21 project forward over the base and are provided with pillow blocks 23 forming bearings for the shaft 24. Shaft 24 is provided, between the bearings 23, with an eccentric 25 preferably formed integral with the shaft. An eccentric strap 26 surrounds the eccentric and is pivoted by pin 27 to the plunger 28 sliding in plunger bearing 22. Secured to the lower end of plunger 28 is a toe pressing device 29 which is not described in detail as it is described and claimed in the parent application above referred to.

Loosely mounted on the end of the shaft 24 is a pulley 40 which also serves as the fly wheel of the machine. Secured to the hub of the pulley is a steel disk 41 having in its face a single recess 42 and forming one member of the clutch by which intermittent motion is applied to the plunger 28. The second member of the clutch comprises a disk 43, rigidly secured to or formed integral with the shaft, and a pair of dogs or detents 44, slidingly mounted therein as best shown in Figure 5. Heads 45 on the dogs 44 are each provided on the inner side with a flattened face 46 making sliding contact with a corresponding flat face on a collar 47 on the shaft. Central apertures in the dogs 44 each contain a coil spring 48 and a plunger 49. The ends of the plungers 49 bear against a disk 50 secured to the adjacent pillow block 23 and thus through the spiral springs tend to force the dogs against the disk 43. Formed in the outer side of each of the heads 45 is an inclined slot 51 which, by engagement with a retracting finger may withdraw the dog from the recess 42. Secured to the right-hand pillow block 23 is a fixed retractor 52, while a movable retractor 53 is mounted in a bracket 54 secured to the frame. The retractor 53 is actuated by a rod 55 controlled by a treadle (not shown).

When the movable retractor 53 is in operative position, as shown in Figure 4, both dogs will be held away from the disk 41 so that the pulley will run idly without imparting any movement to the plunger. When it is desired to start the operation of the press retractor 53 is withdrawn from the position shown in Figure 4. As soon therefore as the recess 42 in the disk 41 comes into register with the lower dog this dog will be forced into the recess by its spring 48 to lock the driving pulley to the driving shaft. The shaft will thus be moved through half a revolution until the dog in engagement with the recess comes into contact with the fixed retractor 52, when it will be withdrawn so that the operation of the press will be stopped to provide an automatic dwell. It will be evident therefore that such automatic dwell will be produced at the end of each half stroke as long as the retractor 53 is withdrawn, and this dwell may be extended to any length of time desired by allowing the retractor 53 to return to the normal position as shown in Fig. 4.

Having fully described my invention, what I claim as new and desire to secure by Letters Patent of the United States is:

1. In a device of the class described, the combination with an actuating shaft of a driving member loosely mounted on said shaft and provided with a single abutment, a clutch member fixedly mounted on said shaft, a pair of detents movably mounted on said clutch member, a fixed retractor for operating on said detents at each semi-revolution of the driving member and a movable retractor adapted to be moved into and out of position to operate on the detents.

2. In a device of the class described, the combination with a shaft, of a driving member loosely mounted on said shaft and provided with a single fixed abutment, a driven member rigidly carried by said shaft, a pair of spring actuated movable detents carried by said driven member, a fixed retractor for engaging with said movable detents, and a movable retractor adapted to be thrown into and out of the path of said movable detents.

3. In a device of the class described, the combination with a shaft, of a driving member loosely mounted on said shaft and provided with a single fixed abutment, a driven member rigidly carried by said shaft, a pair of laterally sliding dogs carried by said driven member and adapted to cooperate with said fixed abutment, plungers in said dogs, springs interposed between said plungers and dogs, a fixed retractor for engaging with said dogs, and a movable retractor adapted to be thrown into and out of the path of said dogs.

4. In a device of the class described, the combination with a shaft, of a driving member loosely mounted on said shaft and provided with a single fixed abutment, a driven member rigidly carried by said shaft, a pair of laterally sliding dogs carried by said driven member and adapted to cooperate with said fixed abutment, plungers in said dogs, springs interposed between said plungers and dogs, a wear plate against which the ends of said plungers bear, a fixed retractor for engaging with said dogs, and a movable retractor adapted to be thrown into and out of the path of said dogs.

In testimony whereof, I hereunto affix my signature, this 19th day of September, 1925.

ALBERT F. FROUSSARD.